(12) United States Patent
Thompson et al.

(10) Patent No.: US 6,623,039 B2
(45) Date of Patent: Sep. 23, 2003

(54) MULTI-PURPOSE CARD

(76) Inventors: Kenneth Thompson, 2368 Eastman Ave., Suite 3, Ventura, CA (US) 93003; Debra Tak Thompson, 2368 Eastman Ave., Suite 3, Ventura, CA (US) 93003

( * ) Notice: Subject to any disclaimer, the term of this patent is extended or adjusted under 35 U.S.C. 154(b) by 0 days.

(21) Appl. No.: 09/865,652

(22) Filed: May 25, 2001

(65) Prior Publication Data
US 2002/0130510 A1 Sep. 19, 2002

Related U.S. Application Data

(63) Continuation-in-part of application No. 09/812,020, filed on Mar. 19, 2001.

(51) Int. Cl.⁷ .............................................. B42D 15/00
(52) U.S. Cl. ........................... 283/61; 281/51; 281/116
(58) Field of Search .................. 283/70, 72, 82, 283/83, 74, 75, 80, 81, 99, 904, 116, 61, 62

(56) References Cited

U.S. PATENT DOCUMENTS

| | | | |
|---|---|---|---|
| 5,308,120 A | 5/1994 | Thompson | |
| 5,417,458 A | 5/1995 | Best et al. | |
| 5,501,491 A | 3/1996 | Thompson | |
| D377,372 S | 1/1997 | Thompson | |
| D378,220 S | 2/1997 | Thompson | |
| D395,455 S | 6/1998 | Thompson | |
| 5,776,287 A | 7/1998 | Best et al. | |
| 5,844,230 A | * 12/1998 | Lalonde | 235/487 |
| 5,865,470 A | * 2/1999 | Thompson | 283/70 |
| D415,194 S | 10/1999 | Thompson | |
| 6,092,841 A | 7/2000 | Best et al. | |
| 6,099,043 A | * 8/2000 | Story | 283/99 |
| 6,305,716 B1 | * 10/2001 | Warther et al. | 283/82 |

* cited by examiner

Primary Examiner—Willmon Fridie, Jr.
(74) Attorney, Agent, or Firm—Scott W. Kelley; Kelly Bauersfeld Lowry & Kelley, LLP

(57) ABSTRACT

A multi-purpose card includes a combination of a plurality of coupons detachably cut into the redemption card, a bar code imprinted onto the redemption card, integrated circuit chips, and/or a scratch-off foil overlying an offer or information printed on the card. The multi-purpose card may be housed integrally in a promotional mailer in the form of a two-piece in one post card. The card is created and defined within the promotional mailer by score lines intermittently cut through a top layer, base layer and plastic film of the mailer in a manner to securely maintain the card in place until forcibly removed.

10 Claims, 16 Drawing Sheets

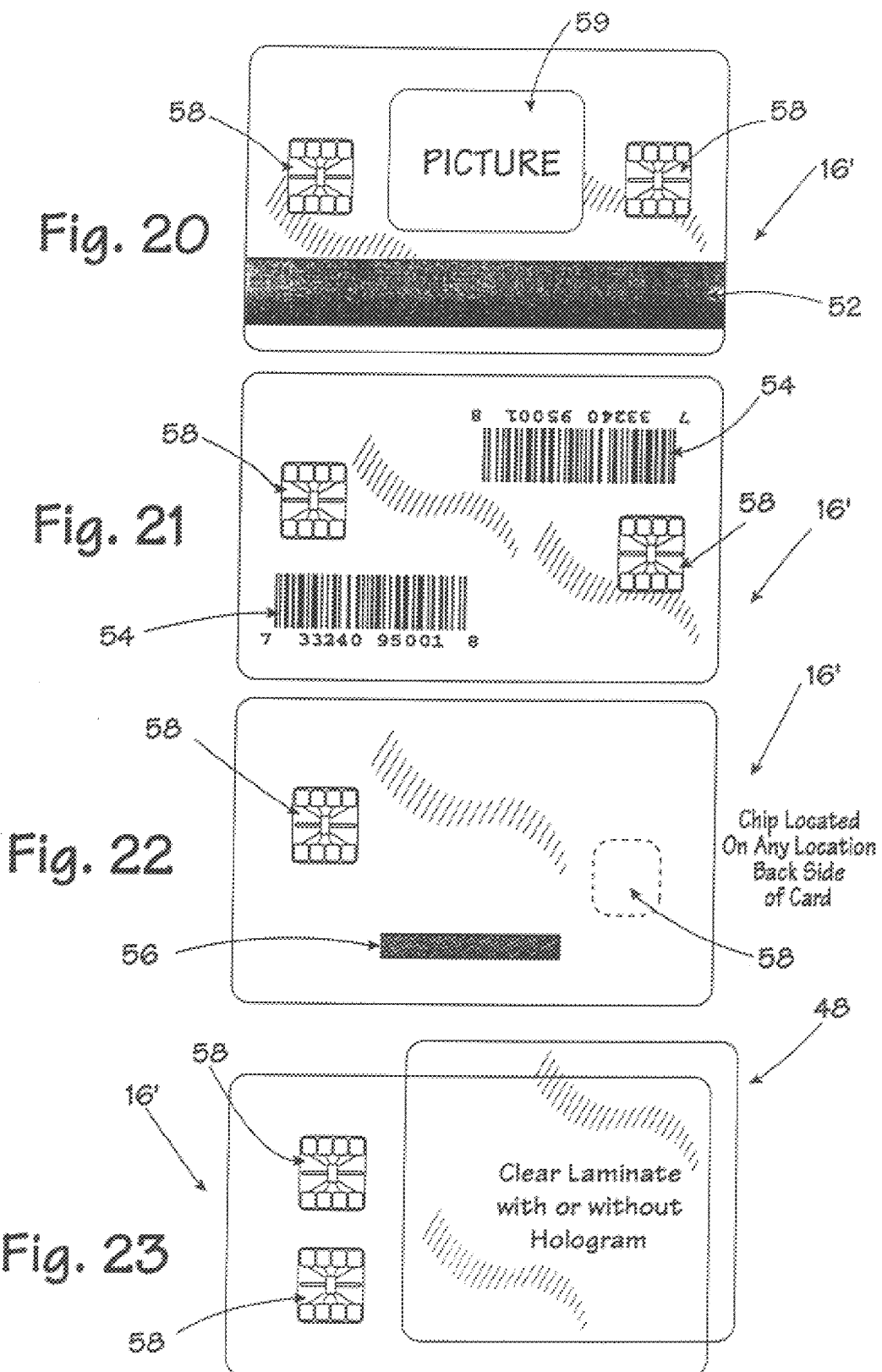

MULTI-PURPOSE CARD

RELATED APPLICATION

This application is a continuation-in-part of U.S. patent application Ser. No. 09/812,020, filed Mar. 19, 2001.

BACKGROUND OF THE INVENTION

The present invention relates to redemption and financial cards. More particularly, the present invention relates to a multi-purpose card which may be disposed within a promotional mailer.

Coupon cards having a number of mini-coupons which may be removed and redeemed are well known. It is also well known to place an individual mini-coupon directly on a product for instant redemption. The mini-coupons are a popular means of attracting customers and encouraging additional sales. The prior art coupon cards and mini-coupons have various constructions and are used for a multitude of applications. Examples of some prior art coupon cards and mini-coupons are disclosed in U.S. Pat. Nos. 4,479,838; 4,767,654; 5,308,120; U.S. Pat. No. Des. 378,220; U.S. Pat. Nos. 5,501,491; 5,865,470; U.S. Pat. No. Des. 395,455; U.S. Pat. No. Des. 415,194; and U.S. Pat. No. 5,417,458.

One-piece promotional mailers are also well known in the art. These mailers are typically sent through the postal service system under a bulk rate postage. The postal service system requires a particular size and format for a first class postcard, which must be at least 0.007" thick and no more than 0.16" thick, at least 3.5" in width, and no more than 4.25" in width, and at least 5" in length, and no more than 6" in length. Cards which exceed the maximum postcard size are charged an increased rate.

The mailers usually have advertisements, informational messages and other like promotional verbiage imprinted thereon. There may also be an index card, such as Rolodex type business card, at least partially attached to the mailer. Specifically, the index cards are at least partially die cut from the mailer. A user then tears the index card out of the mailer. Examples of promotional mailers having removable index cards are disclosed in U.S. Pat. Nos. 4,957,311 and 5,076,490. The prior art mailers, however, are formed of a single sheet of paper material such that the structural integrity of the mailers is in question. In addition, the die cuts reduce the rigidity of the mailers. During the high speed processing of the mailers, the index cards may become detached or deform about the die cuts such that the mailers become damaged, mutilated or otherwise destroyed.

Coupon cards, although known in the art, have typically been limited to a single type. For example, the cards include only detachable coupons, or a magnetic strip, or a bar code, or the like. In the even that more than one of these redemption means are included in the card, they are typically interrelated so as to remain one-dimensional. The same applies to other types of cards, such as financial credit cards, debit cards and the like. Typically, a consumer has a credit card issued by one company, such as a Visa® card, which will have a magnetic bar strip and other identifying logos and information imprinted thereon. There are not only several types of credit cards, but also gasoline cards, department store cards, as well as other cards relating to specific organizations and the like. The result is that the consumer carries multiple cards in his wallet or her purse. This is necessarily so as one retail establishment may accept a particular credit card while not accepting others. Similarly, in order to qualify for a reduction in price or other benefits, the consumer must present the particular card of the retail establishment or gasoline service station often times in addition to a credit or debit card upon payment. As most consumers can only track a certain number of cards, as well as the fact that wallets and purses are limited in the cards that they can hold, the consumer often times will limit the number of cards in his or her possession.

Accordingly, there is a need for a promotional mailer having sufficient structural integrity to support a removable item disposed within the mailer. In addition, it would be desirable to incorporate the advantages and popularity of the mini-coupons or other retail incentive means into the convenience of a first class or bulk rate promotional mailer. It would be even more desirable to incorporate a multi-purpose card, having a plurality of mini-coupons, other retail incentives, or financial information into a structurally sound mailer. Finally, it would be desirable to incorporate multiple redemption means, such as retail incentives, or means for conducting multiple financial transactions on a single card. The present invention fulfills these needs and provides other related advantages.

SUMMARY OF THE INVENTION

The present invention relates to a two-piece in one postcard housing an integral multi-purpose card in the form of a promotional mailer, and a multi-purpose card. The promotional mailer generally comprises a base layer, typically comprised of plastic or card stock, having a peripheral edge and first and second opposing surfaces. A plastic film is laminated to the first side of the base layer. A top layer is adhered to the second layer of the base layer. A release liner may be disposed between the base layer and the top layer. For additional support, a plastic film may be laminated on the top layer. A multi-purpose card is created in the promotional mailer and defined by score lines intermittently cut through the top layer, base layer and plastic film so as to securely maintain the redemption card in place until it is forcibly removed by tearing away the redemption card at the score lines. The multi-purpose card has at least one edge which is defined by the peripheral edge of the base layer. The multi-purpose card includes multiple means for redeeming offers associated with the card or conducting financial transactions.

Typically, the peripheral edge of the base layer, and thus the promotional mailer, is defined by first, second, third and fourth peripheral edges which define a quadrilateral. Preferably, the first and third peripheral edges are parallel to one another and have a length of between 3.5 and 4.25 inches, and the second and fourth peripheral edges are parallel to one another and have a length of between 5.0" and 6.0" so as to qualify for post card bulk rate. At least one of the first or second surfaces of the base layer include matter imprinted thereon. Usually, the imprinted matter includes a postage area and an addressing area positioned outside the redemption card.

The redeeming and financial transaction means associated with the multi-purpose card includes a first integrated chip associated with the multi-purpose card and at least one of a magnetic strip, a bar code, detachable coupons or a second integrated circuit chip. These redeeming and financial transaction means are often associated with the base layer of the card, which can be comprised of plastic or paper depending upon the intended function of the card. The first or second integrated circuit chip can be partially embedded into the base layer, or adhered onto a surface of the base layer or card. Typically, the multi-purpose card includes first and second integrated circuit chips which can be on the same surface, or opposite surfaces, of the base layer of the card. The first and second integrated circuit chips can be aligned, or misaligned with one another. The card may include a laminate layer including a hologram which overlies and is attached to the base layer. The card may also include a picture for security purposes or the like, as well as a defined area having information printed thereon and covered with a scratch-off foil treatment. The information underlying the foil treatment can include passwords, activation information, or redemption offers. Preferably, the multi-purpose card has dimensions approximating a credit card, so that it can be placed in the consumer's wallet. The multi-purpose card can be housed in the promotional mailer, or produced and delivered by traditional means.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 20 is a top plan view of another multi-purpose card embodying the present invention, having a magnetic strip, two integrated circuit chips, and a picture associated therewith;

FIG. 21 is a top plan view of a multi-purpose card embodying the present invention and having integrated circuit chips and bar codes associated therewith;

FIG. 22 is a top plan view of a multi-purpose card embodying the present invention, having a scratch-off foil treatment area, and two integrated circuit chips on opposite sides of the card;

FIG. 23 is a partially exploded top plan view of a multi-purpose card embodying the present invention, having two integrated circuit chips aligned with one another towards an edge of the card, and having a laminate thereon;

DETAILED DESCRIPTION OF THE PREFERRED EMBODIMENTS

Figure 1:
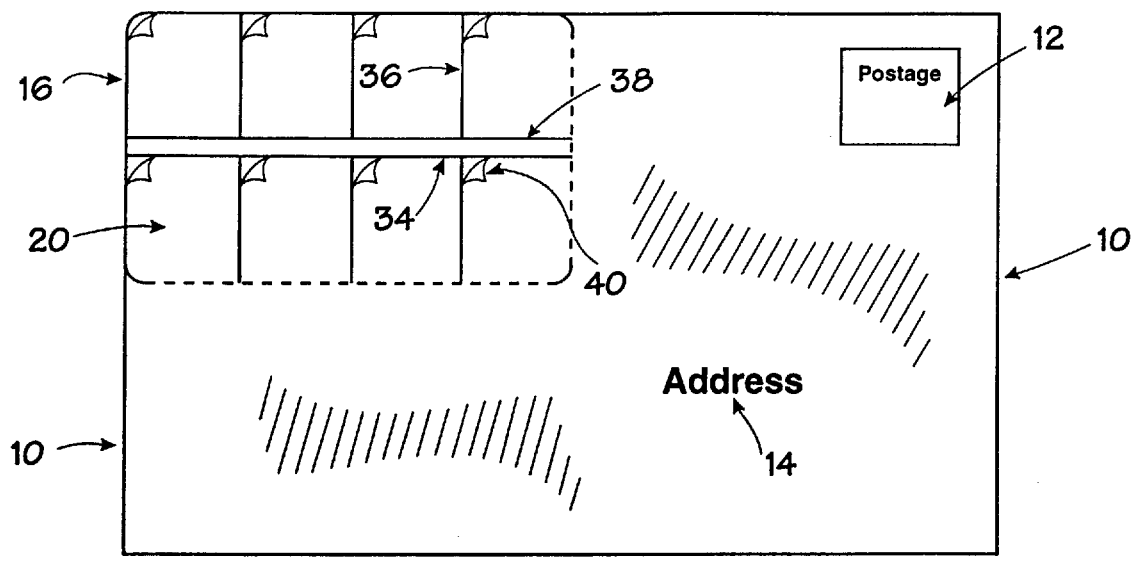
FIG. 1 is a top view of a front side of a promotional mailer embodying the present invention.

As shown in the drawings for purposes of illustration, the present invention is concerned with a promotional mailer, generally referred to by the reference number 10. Although not limited to such, the overall size of the promotional mailer is preferably limited to a first class post card, wherein the peripheral edges define a quadrilateral having a length of between 5.0" and 6.0", and a width of between 3.5" and 4.25". However, the promotional mailer 10 may be of varying sizes with added postage paid to send to the prospective user. The promotional mailer 10 includes a postage area 12 and an addressing area 14 imprinted thereon, typically on a front side thereof.

Figure 2:
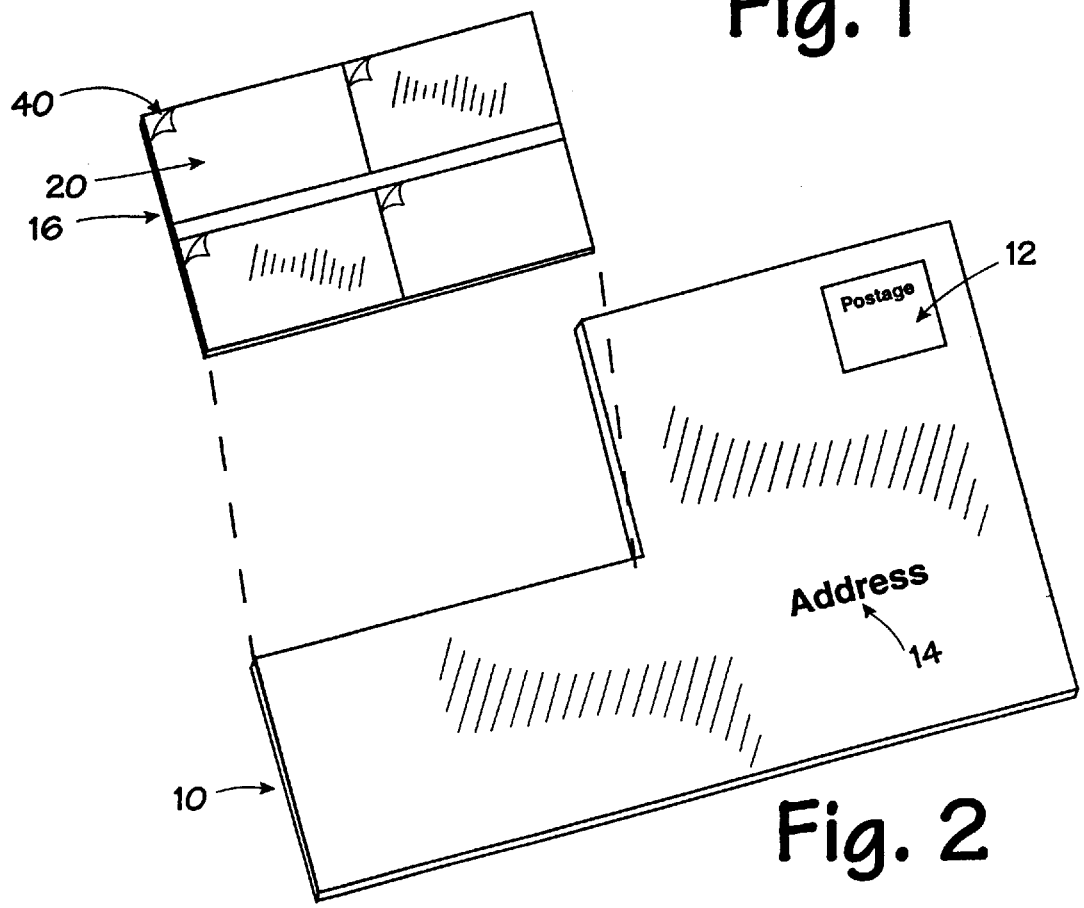
FIG. 2 is an exploded view of the promotional mailer of FIG. 1, illustrating the detachment of a redemption card therefrom.

With continuing reference to FIGS. 1 and 2, the promotional mailer 10 includes a redemption card 16 which is built into the promotional mailer 10 so that at least one peripheral edge of the redemption card 16 is defined by the periphery of the promotional mailer 10. The redemption card 16 is defined by perforations 18 or the like, so that the redemption card 16 can be detached from the promotional mailer 10, as illustrated in FIG. 2.

Figure 3:
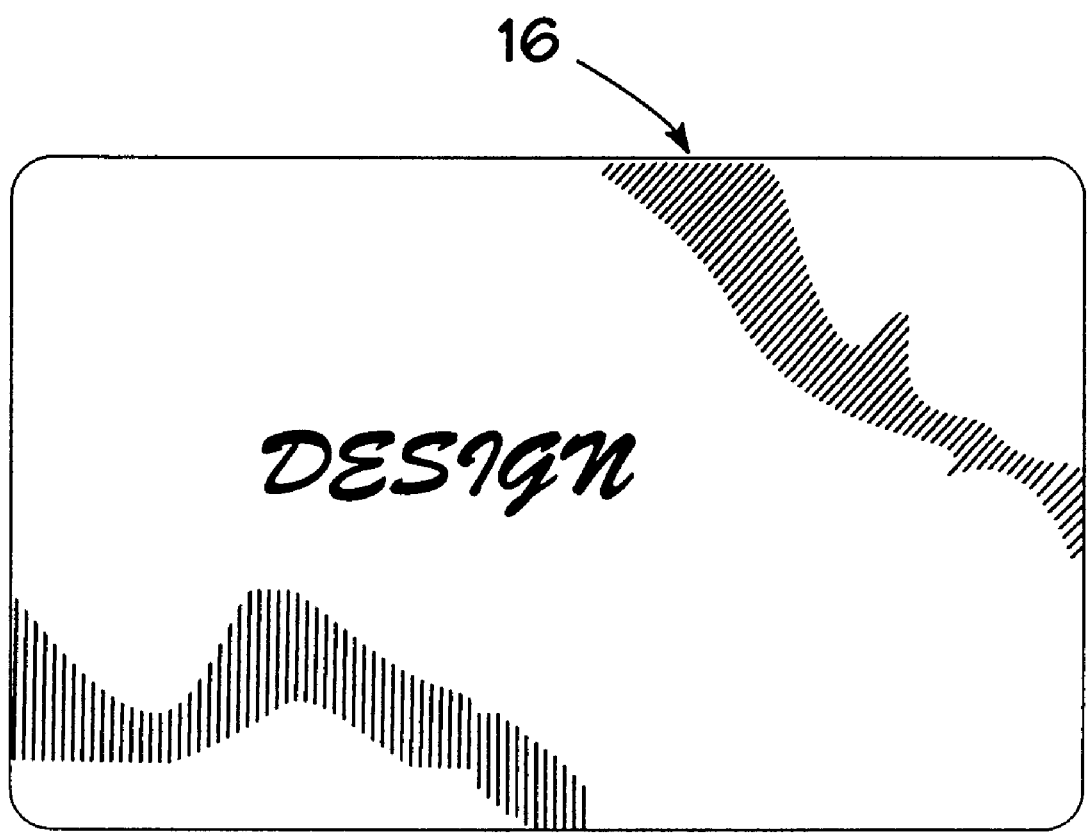
FIG. 3 is a top view of a back side of the redemption card of FIG. 2.

The redemption card 16 includes promotional offers and the like and means for redeeming such offers which are associated with the redemption card 16. As illustrated in FIGS. 1 and 2, the promotional offers comprise one or more coupons 20 which are detachably cut into the redemption card 16. Although these promotional offers can be associated on either a front or back surface of the redemption card 16, typically they are created on the front side thereof, with identifying designs, trademarks or the like imprinted on the back side thereof, as illustrated in FIG. 3.

Figure 4:
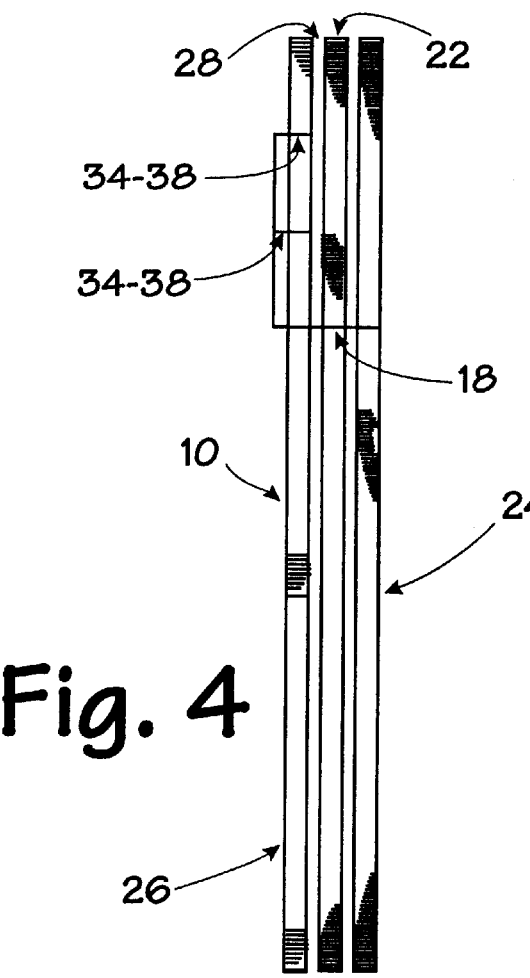
FIG. 4 is a cross-sectional view of a promotional mailer embodying the present invention.

Referring now to FIG. 4, a cross-section of a promotional mailer 10 embodying the present invention is shown. The promotional mailer 10 is fabricated from three flat sheets of superimposed, layered material. The thicknesses of the layers are exaggerated to clearly illustrate the layering of the mailer 10. The mailer 10 is comprised of a base layer 22 comprised of plastic or paper. A plastic film 24 is laminated or a clear coating applied to a front side of the base layer 22. Typically, the face (the back side of the mailer 10) of the base layer 22 is imprinted with identification, graphics, or advertising and the like which is readily visible on the mailer 10. The plastic film 24 covers the advertising to provide a more durable and shiny surface to the promotional mailer 10. The top plastic film 24 is known as "face stock" and is typically comprised of a clear plastic, UCL Polyolam NPL Film. On the other side of base layer 22 is adhered a coupon or redemption layer, referred to herein as the top layer 26, and known in the industry as the "front side"—referring to the front side of the mailer 10, which is comprised of a suitable paper or plastic. Of course, prior to adhering the top layer 26 onto the base layer 22, the postage 12, address 14 and other necessary information is imprinted onto the base layer 22. Typically, there will be an adhesive layer 28 intermediate the top layer 26 and base layer 22.

Figure 5:
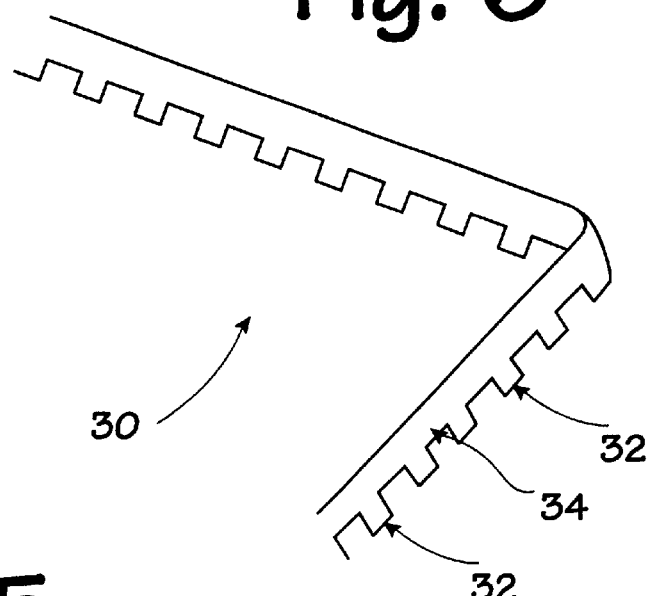
FIG. 5 is an elevational view of a perforating rule, used to perforate the redemption card in a particularly preferred embodiment of the present invention.

The redemption card 16 is defined by the perforations 18 or the like. Although there are a variety of means of producing such perforations, it is preferred to use the teflon coated rule 30 illustrated in FIG. 5. This rule 30 is constructed utilizing the most modern technologies for grinding to produce a variable tooth rule. The rule 30 includes a lower edge having stepped teeth 32 which are sized to cut through the layers 22–26 of the promotional mailer, while leaving staggered portions which cut through all but 0.003" of the layers 22–26. Thus, the rule 30 makes two stepped cuts at the same time. The teeth cutting portions 32 cuts through the mailer 10, while the shorter portion of the rule 34 cuts through all but 0.003" of material, leaving sufficient uncut portions of layers 22–26 to maintain the promotional mailer 10 structural integrity. The rule 30 is configured such that the downwardly projecting teeth 32 form perforations 18 entirely through all three layers 22–26, while the raised portions 34 cuts through the top layer 26 and base layer 22, leaving plastic film 24 unpunctured at that site. The plastic film 24, perforated in such a manner, is strong and durable enough to hold the redemption card 16 in place while it is handled in the mail system.

The thickness of the layers 22–26 when assembled to form the promotional mailer 10 is preferably between 0.007" and 0.016" so as to meet the requirements of a first class post card. However, the promotional mailer 10 can be thicker with additional postage paid, if necessary.

In a particularly preferred embodiment, the redemption card 16 comprises a single card which approximates the size of a credit card so as to be carried in one's wallet. The card 16 itself is thin, 0.007" to 0.016" in thickness, and has approximate dimensions of 3.375" in length and 2.125" in width. The corners of the card 16 may be rounded during the perforation process.

As illustrated in FIGS. 1–4, the redemption card 16 includes a plurality of small coupons 20. The redemption card 16 may have as few as one but as many as sixteen peel-off coupons 20 secured thereto. It is to be understood that the detachable coupon 20 can be of any size so as to fit on the redemption card 16. The detachable coupon 20 can be comprised such that adhesive does not remain on the coupon 20 when removed, so that the coupon can be sent to a clearing house for processing. The coupon face of the top layer 26 has coupons imprinted thereon which are "kiss cut" at regular intervals to form a matrix of small adhesive backed removable coupons 20. The term kiss cut is a printers term and is similar to a die cut, but the cut is made sufficiently deep to form the removable coupons 20, without cutting into or through the remaining layers 22 and 24. Each coupon 20 is cut at adjoining edges 34, 36 and 38 by the kiss-cut process so that one can peel away a corner of the coupon 20 with one's fingernail and then easily remove that particular coupon 20. A "dog ear" marking 40 is illustrated at one corner of each coupon 20 to visually indicate to the user where to begin the peeling process. The underside of the coupon 20 has an adhesive backing 28 which holds the coupon 20 in place. Each coupon 20 on the redemption card 16 has printed matter imprinted thereon when the promotional mailer 10 is fabricated. In a particularly preferred embodiment, the printed matter on each coupon 20 is for a cash price discount or a buy one-get one free offer at a restaurant or retail store.

Thus, the promotional mailer 10 requires approximately five different operations to construct the mailer 10. The layers 22–26 are created or obtained in sheet or roll form. Advertising or the like is then printed on the face of the base layer 22, as well as on the top layer 24 or 26 to create the coupons 20. After the printing has taken place, the top or front face is covered with a durable plastic liner or sealed with a liquid protective sealant. The coupons 20 are then kiss-cut after the printing process. Therefore, the process generally comprises printing the top or front and bottom portions of the mailer 10, adhering or laminating the plastic film and top or front layer 24 and 26 onto both sides of the base layer 22, and kiss-cutting the coupons 20 within the redemption card 16 after the redemption card 16 has been perforated.

Although certain materials have been described as being preferred, it is to be understood that the specific materials used to form the promotional mailer 10 can be substituted and fabricated from a great number of materials. The adhesive layer 28 can be of any number of adhesives which permit the coupons 20 to be peeled therefrom.

Figure 6:
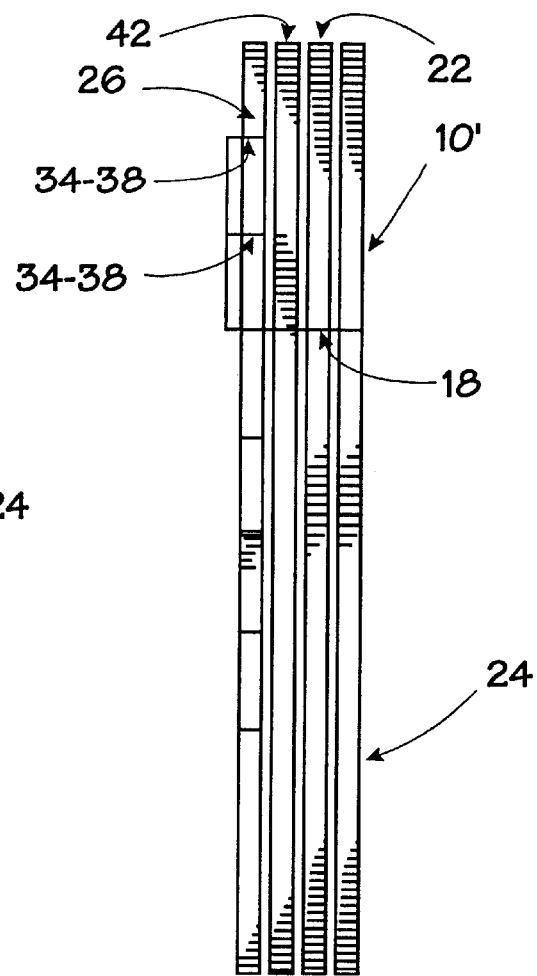
FIG. 6 is a cross-sectional view of another promotional mailer embodying the present invention, and having a clear cover.
Figure 7:
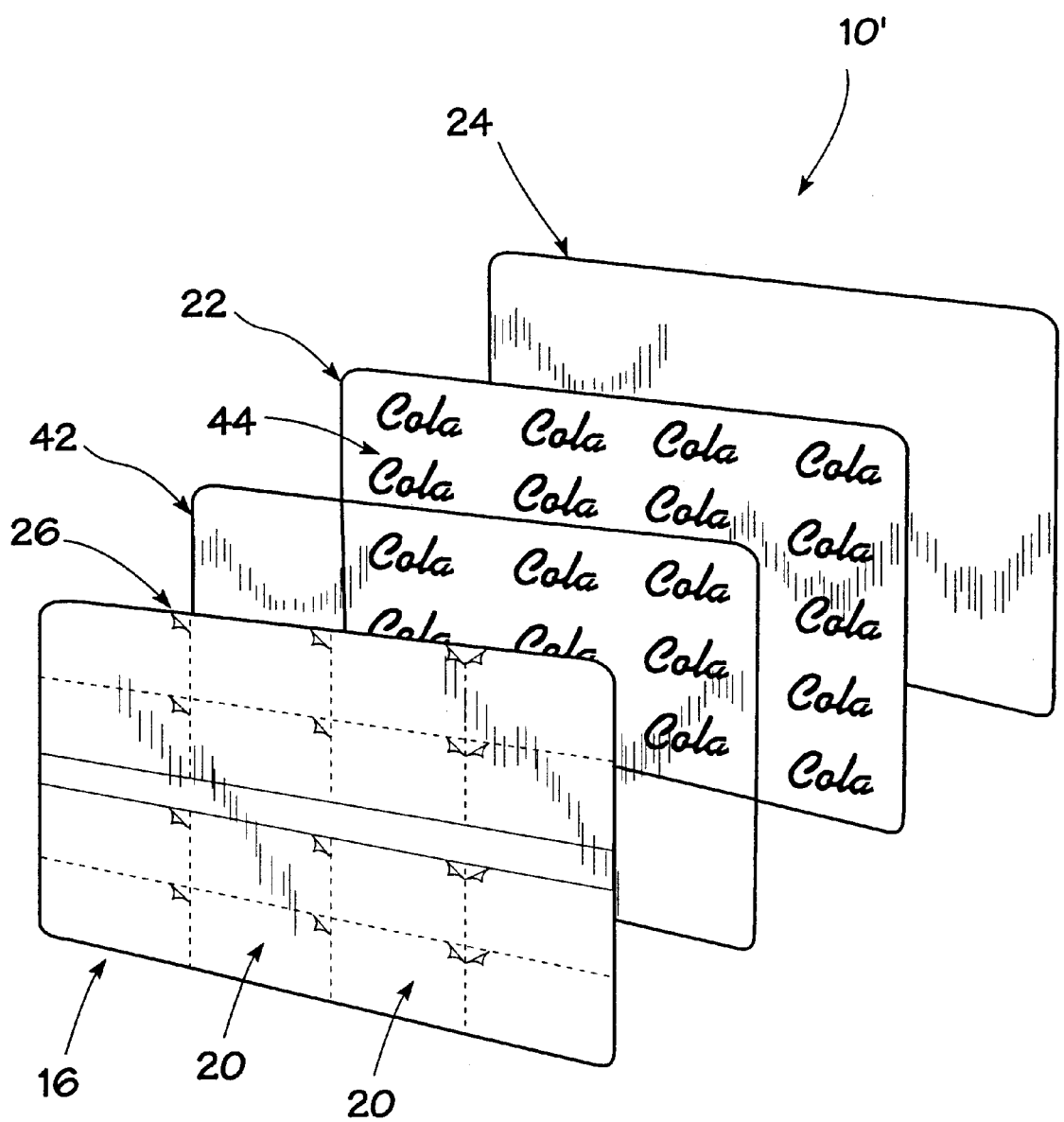
FIG. 7 is an exploded view of a redemption card derived from the promotional mailer of FIG. 6.
Figure 8:
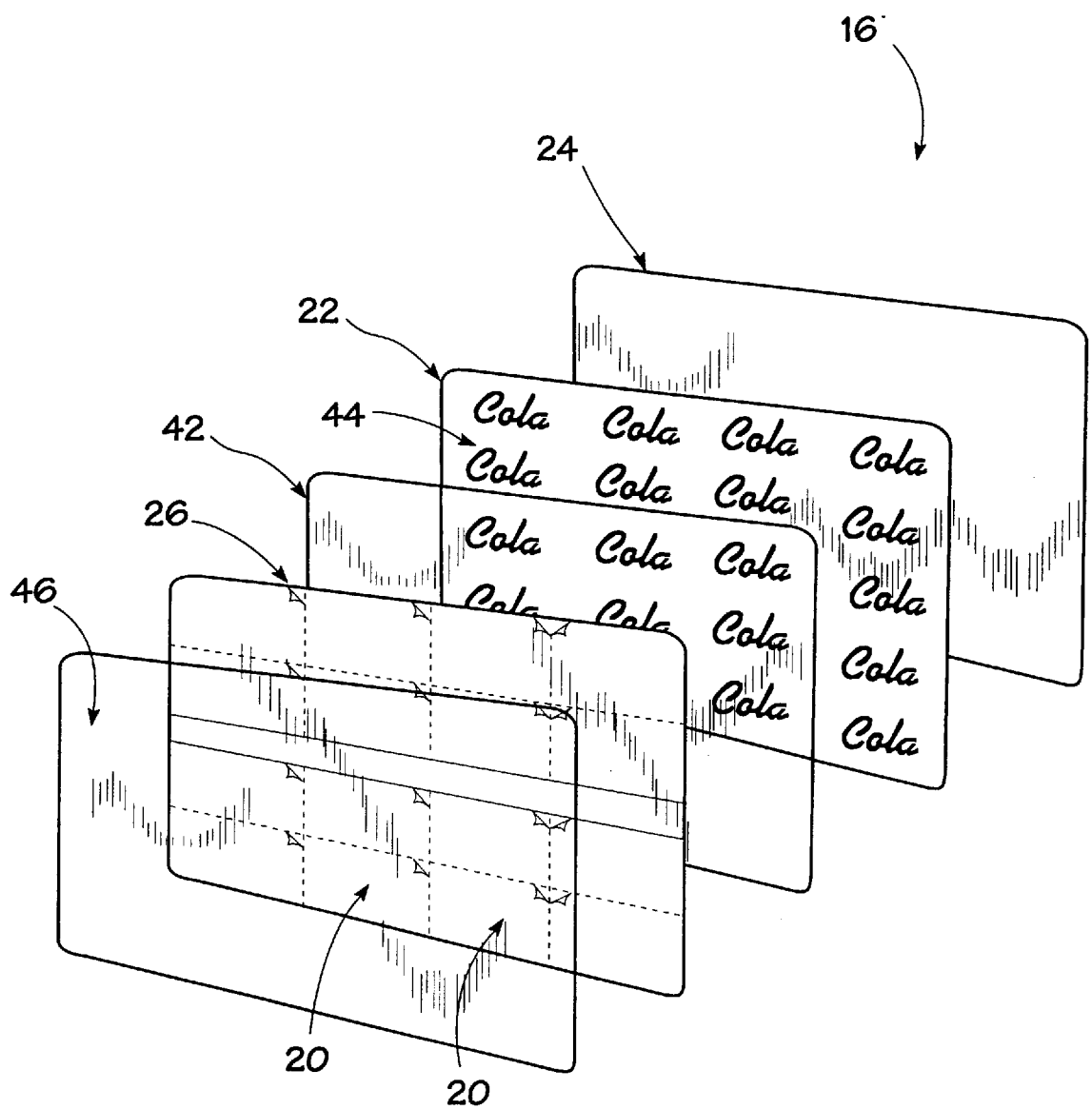
FIG. 8 is an exploded view of another redemption card in accordance with the present invention, having a clear front layer.

Referring now to FIGS. 6–8, another embodiment of the promotional mailer 10 is shown comprising four layers. Essentially, the construction of this mailer 10' is the same as previously described, with the addition of a release liner 42 interposed between the base layer 22 and top coupon layer 26. Thus, the four layers are the top protective plastic film layer 24, the base layer 22, the release liner layer 42, and the coupon top layer 26. Similar to that described above, the base layer 22 is approximately 0.012" in thickness. Once again, the front and back face of the base layer 22 have printed matter thereon. Preferably, the plastic film layer or protective coating 24 and release liner 42 are clear so as to view printed matter therethrough. As described in FIG. 3, the back face of the redemption card 16 typically contains the name of the card and information about the card 16, in the form of a billboard for printing identification, graphics, advertising, etc. The front face of the base layer 22 may include similar graphics, trademarks, information, etc. so that as the coupons 20 are removed, these trademarks and designs are visible through the release liner 42, acting as a form of advertisement for the trademark or issuer of the card. However, it is to be understood that the release liner 42 need not be transparent, but can also be opaque.

The release liner 42 can be formed with the adhesive applied to the back of the base layer 22, which sets to form a clear release layer 42. Alternatively, the release layer 42 can be comprised of a sheet of clear plastic, with the adhesive applied between the release liner 42 and the back of the coupons 20. It is to be understood that during the laminating process is to form the completed card 16, the laminate can be made to adhere to the other layers 22–26 without the application of adhesive to hold the layers together.

The release liner 42 is preferably of a type of material that evaporates immediately after the coupon 20 is removed from the base. The removed coupon 20 does not have any adhesive left on it after removal from the coupon card 16. The coupon 20 is treated as any other store coupon in that after the coupon 20 is scanned with a bar code reader, it is placed in the coupon drawer along with all the other conventional coupons received. Any residual adhesive left on the coupon 20 would cause it to stick to the other coupons in the coupon drawer, or to the cashier's fingers, or to the bar code reader, which would make the coupon unusable as a store cents off coupon. The release liner 42 an be a fine film about 0.001" thick which is applied to the back of the base before the coupon layer is applied to the release liner 42. The laminated sheet is then run through a die to "set" the release liner 42. It is somewhat in liquid form, and yet cannot evaporate or sublime because it is sealed between the base layer and the coupon layer.

Figure 9:
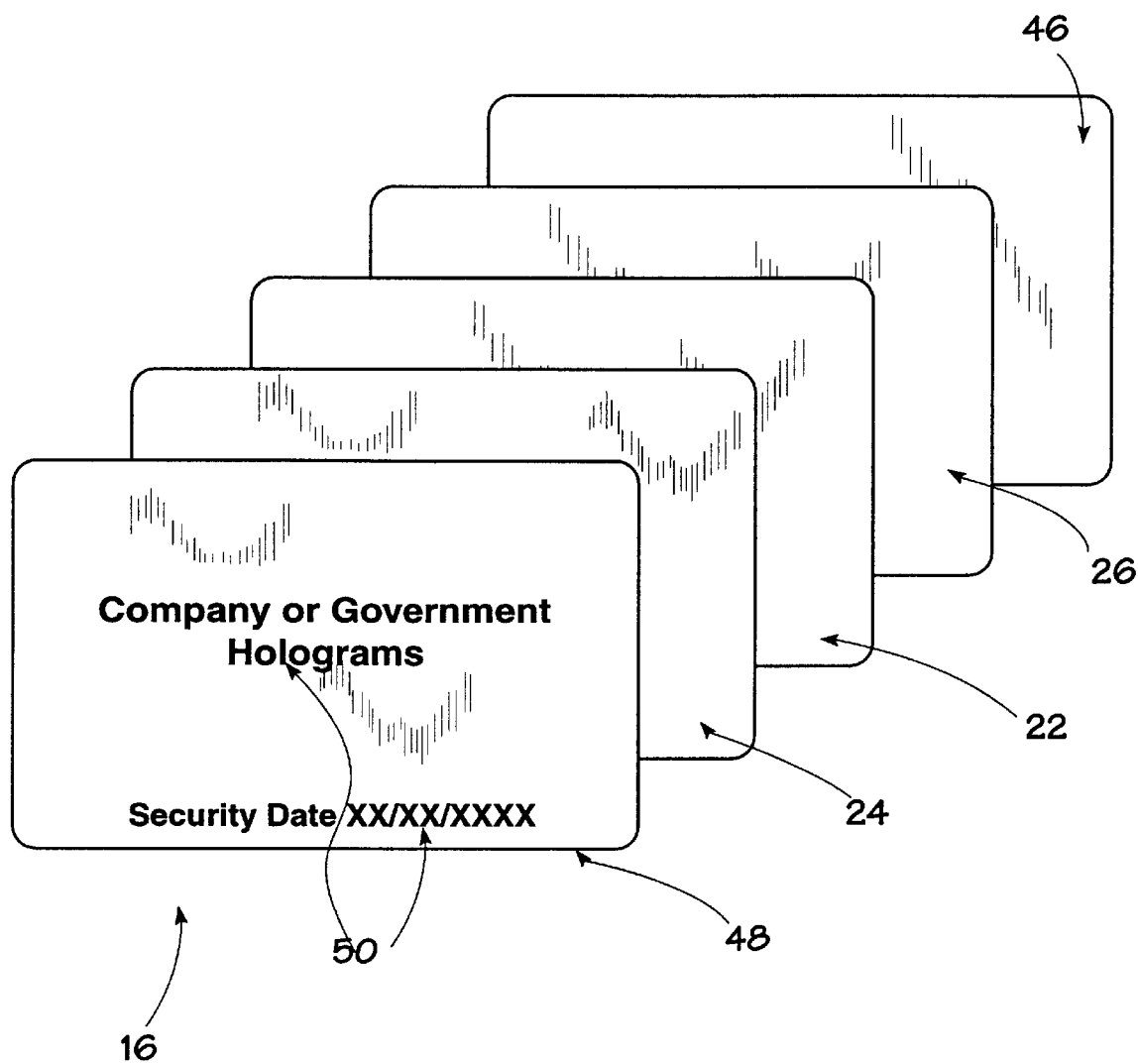
FIG. 9 is an exploded view of yet another redemption card having a hologram in accordance with the present invention.

As illustrated in FIG. 8, a plastic or clear coated laminate 46 or the like may be attached to the top layer 26, and subject to the kiss-cut process, for added support of the coupons 20. Referring now to FIG. 9, the laminate sheet 46 added to the top layer 26, or preferably the plastic film layer 24, is imprinted with a hologram 50 or the like for use as a security card or identification card. The imprinted information 50 may also include identifying indicia in the form of dates, serial numbers, etc. Such cards can be used, for example, in state lotteries where the lottery cards are mailed to the purchasers and include holograms and identifying information 50 which is periodically changed to maintain the security of the lottery. Of course, such cards 16 could also be used in government and corporate applications, such as security and the like.

Figure 10:
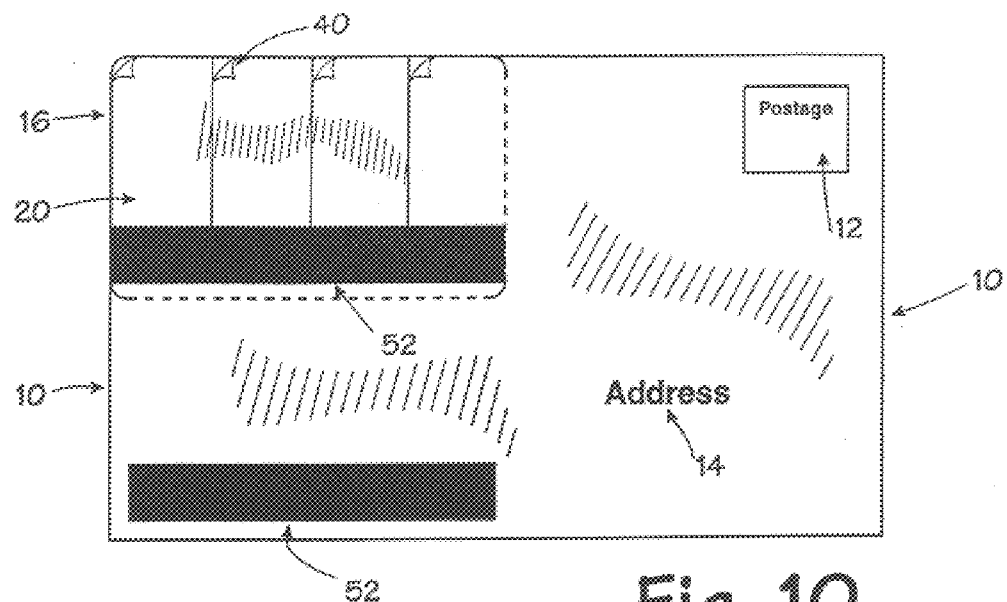
FIG. 10 is a top view of a front side of a promotional mailer having a multi-purpose card bearing detachable coupons and magnetic strips.

With reference now to FIG. 10, a redemption card 16 is shown having a plurality of coupons 20 as well as a magnetic strip 52 positioned along the bottom edge of the card 16. Typically, the magnetic strip 52 is devoid of information when the card 16 is fabricated, and an encoding machine electronically encodes any information on the magnetic strip 52 subsequent to the formation of the promotional mailer 10. It is more preferable that the magnetic strip 52 be encoded at the time the promotional mailer 10 is sent to the user. However, the redemption card 16 may actually be detached from the mailer 10 and taken to a location where the magnetic strip 52 is encoded before use.

Thus, a quantity of promotional mailers 10 including such cards 16 could be fabricated and sold to the ultimate redeemer of the cards 16 who wish to function as a redemption center. The encoding machine could be made available to this entity so that the blank magnetic strips 52 on the cards 16 could be encoded according to the wishes of the purchaser of the mailers 10. Thus, the magnetic strips 52 could be activated either before or after the promotional mailers 10 are sent to the users. Such magnetic strips 52 can be comprised of a transfer tape which has high coercivity, low coercivity or approximately 2,750 coercivity. For example, a 3M magnetic strip 315 84 98011 4811 401, or the like can be applied to the redemption card 16. The magnetic strip 52 itself can be 0.25 to 0.5 inches in width and placed along the bottom edge, or any edge for that matter, of the redemption card 16. Due to the small size of the magnetic strip 52, there is sufficient room on the redemption card 16 for placing other promotional offers, such as the illustrated coupons 20, above the magnetic strip 52. Of course, the magnetic strip 52 can be placed on either the front or back side of the redemption card 16, enabling the back side to be fully used for other promotional offers, such as the detachable coupons 20.

Figure 11:
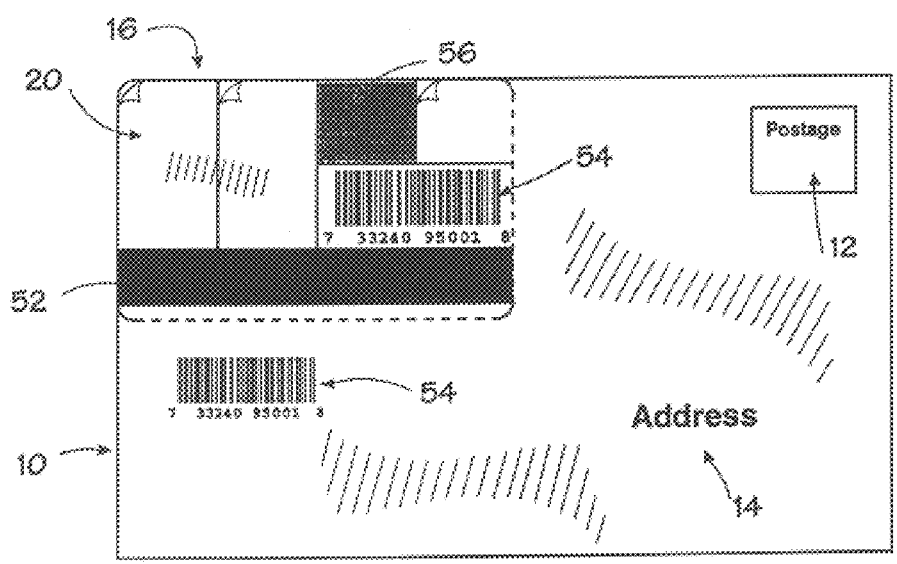
FIG. 11 is a top view of a front side of a promotional mailer in accordance with the present invention, wherein the multi-purpose card includes detachable coupons, scratch-off foil, a bar code, and magnetic strip.

Referring now to FIG. 11, a redemption card 16 is shown having a plurality of redemption offers and means for redeeming such offers, included in such offers are the previously described detachable coupons 20 and magnetic strip 52. However, the card 16 can also include a bar code 54 imprinted thereon, on either side thereof, and scanned in typical fashion for redeeming an offer. The redemption card 16 can also have a bar code 54 associated with each detachable coupon 20 to electronically track the redemption of such coupons 20. Further, one or more of the detachable coupons 20 can be covered with a removable foil layer 56. This scratch-off layer 56 comprises a foil treatment which is applied to one or more of the coupons 20 after the coupons are printed. It is intended that the underlying coupon 20 offers a special prize, item or discount for the card holder. For example, the hidden coupon could offer a prize, free hamburger, coke or fries to the card holder. Likewise, the bar code 54 could indicate an offer relating to an item, such as a medium pizza. The bar code is machine readable by a wand bar code reader or a stationary bar code scanner in typical fashion. The addition of bar codes 54 on the peel-off coupons 20 allows for greater tracking capability on the part of the redemption card center, such as a fast food restaurant.

Figure 12:
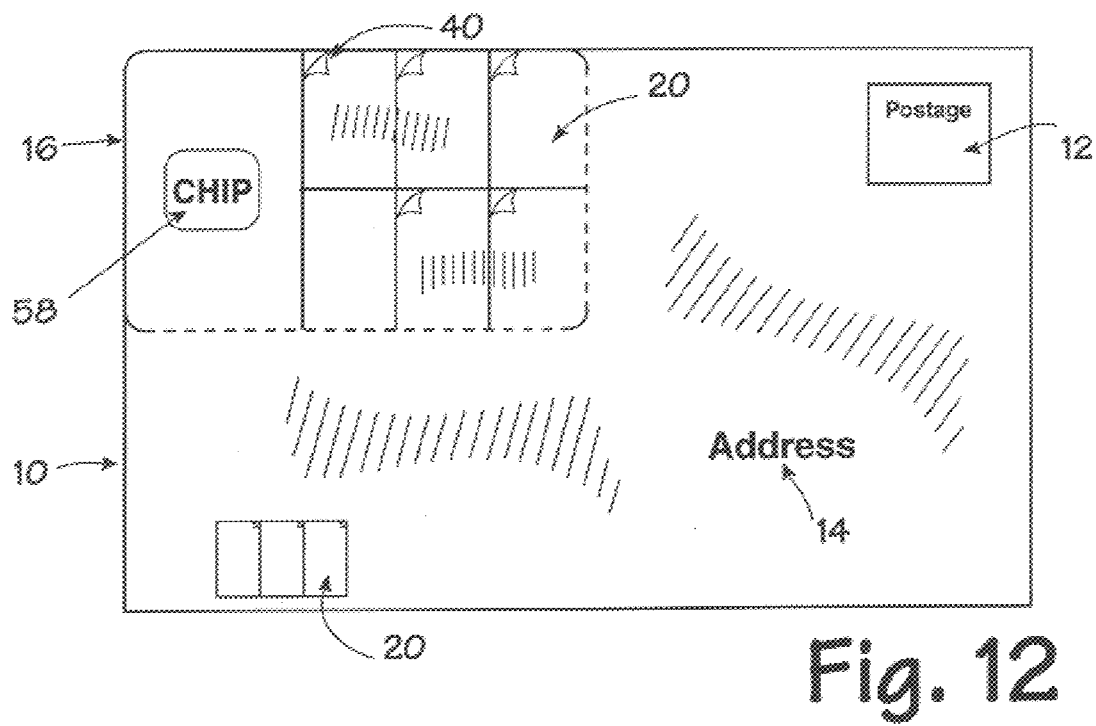
FIG. 12 is a top view of a front side of a promotional mailer in accordance with the present invention, wherein the multi-purpose card includes detachable coupons and an integrated circuit chip.

With reference now to FIG. 12, the redemption card 16 may include a microprocessor chip 58, also known as an integrated circuit chip. Integrated Circuit chips "IC chips" find wide application in the computer industry. A relatively new chip 58 which is comprised of a clear transparent material, lays on top of the card 16. This clear chip 58 may be placed in the standard location on the card 16. The chip 58 can be a wipe-down or blow-down chip 58 to be able to be placed at any location on the card, front or back or two chips 58 for varying use. These chips can be obtained by various companies, including SOLAIC. The chip 58 functions like a ram chip which can be reprogrammed. Memory chips are available and used to make smart cards. After the promotional mailer 10 has been fabricated, the memory or microprocessor chip 58 can be embedded into or adhered onto either side of the redemption card 16.

The face of the chip 58 must typically be exposed so that an electronic reader can read the chip 58. The exposed chip 58 can be adhered to the front or back of the card. The adhered chip 58 can be a memory chip 58 or microprocessor chips 58. The cards illustrated in FIG. 12 can be used as smart cards. The cards also are used as coupon redemption cards as previously discussed. The card 16 is an integral smart card/coupon redemption card/post card. The smart card 16 also can be used as a customer loyalty vehicle with or without coupons.

A card 16 with such a chip 58 can be used in the industry to have an image of a person and other information that will verify the user. The mailer 10 can be the vehicle to deliver the card 16 to the user.

As an example, the micro chip 58 can be adhered to a casino card 16, such as that illustrated in FIGS. 11–12. Casinos now have slot machines with magnetic card readers. Special cards with secret codes on the magnetic strip are handed out to casino customers as a promotion. The card 16 allows the casino patron $25 to $50 or any amount to play the slots. The card holder inserts the card 16 with the magnetic strip 52 into the reader and he is electronically debited with a dollar amount to play the slots. He plays the slots until he gambles away the dollar amount, or if he wins, the slot machine dispenses coins or can credit the magnetic strip 52. The casino card 16 with the micro chip 58 is more sophisticated. The slot machine microprocessor chip 58 readers could be reprogrammed on a daily basis to change the secret codes that are recognized by the reader. The microprocessor chip 58 to be adhered to the casino cards 16 could be electronically programmed with the new code so that the reader would accept the card. A microprocessor chip 58 can easily be reprogrammed even after it has been adhered to the casino card 16. It would be next to impossible for an individual to program a microprocessor chip 58 to make it compatible with the chip 58 reader on the slot machine, acting as a security function of the casino card 16.

The casino card 16 may have multiple offers such as a scratch-off 56 or a magnetic strip 52, or a special bar code 56 for a possible jackpot, the micro chip 58 can give the customer a dollar amount credit to play the slots or playing chips 58, and the peel-off coupons 20 give the customer free or reduced meals and other gratuities as printed on the peel-off coupons 20.

Figure 13:
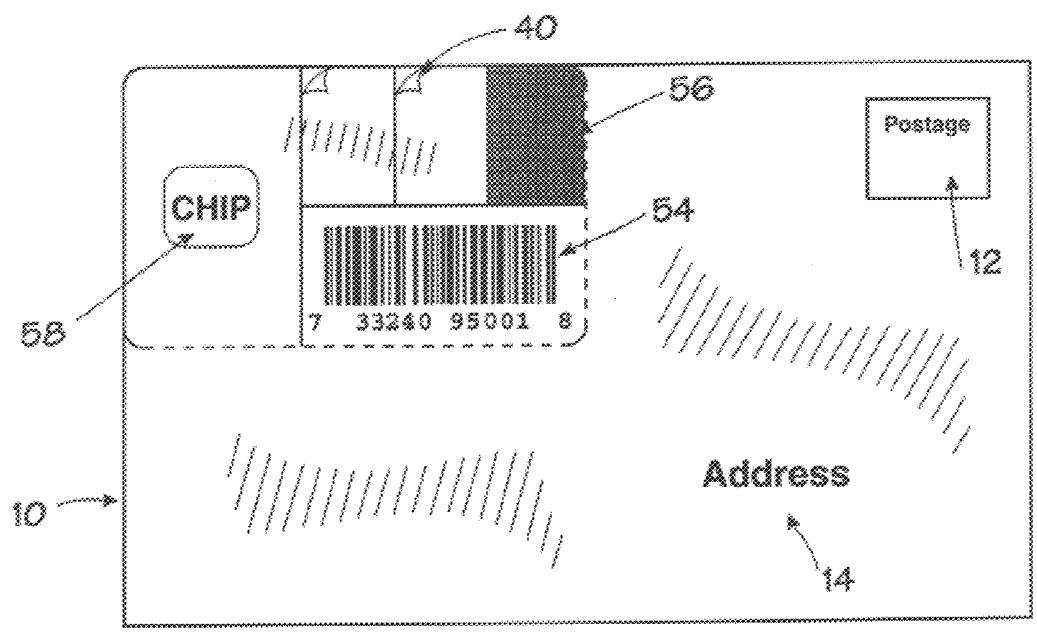
FIG. 13 is a top view of a front side of a promotional mailer in accordance with the present invention, wherein the multi-purpose card includes detachable coupons, an integrated circuit chip, a bar code, and a scratch-off foil.

It is to be understood, that the redemption card 16 can include only one of the redeemable means in the form of coupons 20 magnetic strip 52, bar code 54, scratch off foil layers 56 or computer chip 58, or any combination thereof as illustrated in FIGS. 11–13. These redeemable means can be placed on either side of the redemption card 16. It is also to be understood that the redeemable means as described can be positioned outside of the redemption card 16 and onto the promotional mailer 10 itself. This would allow multiple people to have discounts and offers in the form of the redeemable means with a single promotional mailer. This would also allow a system to be in place for tracking or activating a redemption card 16 by scanning, for example, a magnetic strip or bar code placed on the promotional mailer 10 itself. Similar to the redemption card, the redemption means could be placed on either side of the promotional mailer 10.

Figure 14:
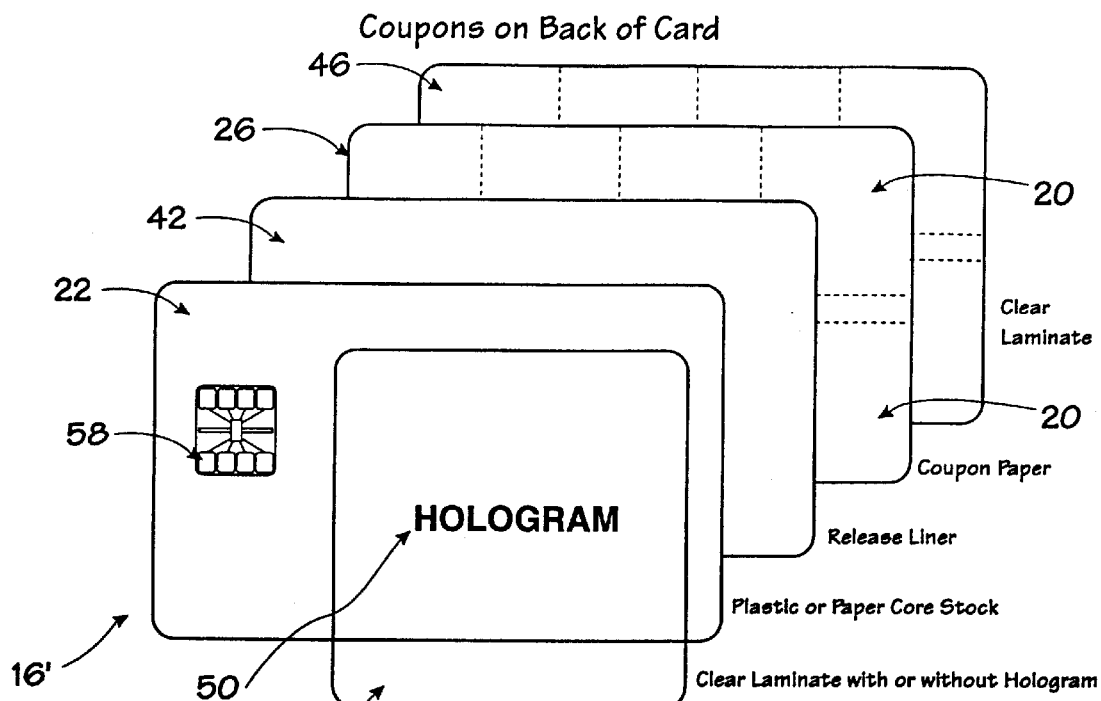
FIG. 14 is an exploded elevational view of a multi-purpose card having an integrated circuit chip on one side thereof, and detachable coupons on an opposite side thereof.

The redemption cards 16 illustrated in FIGS. 10–13 can be multi-purpose in nature. That is, aside from offering various coupons or redemption means for a single entity, more than one commercial entity could offer redemption means on the same card 16 formed in the promotional mailer 10. However, it should be understood by the reader that such multi-purpose cards 16 can also be produced in traditional fashion, without the promotional mailer 10, and distributed by currently existing means. For example, as illustrated in FIG. 14, the base layer 22 can be comprised of either plastic or paper core stock and have a backside thereof covered by the release liner 42 which holds a top coupon layer 26, typically comprised of paper, to the base 22. A clear laminate 46 may be overlayed on the coupon top layer 26, and the laminate 46 and top layer 26 kiss-cut as described above to form the removable coupons 20. On the opposite front side of the base layer 22, an integrated circuit chip 58 can be attached, adhered, or applied by any other method. Further, a clear laminate 48 may be attached to the front side of the base layer 22 and may or may not include a hologram 50.

Figure 15:
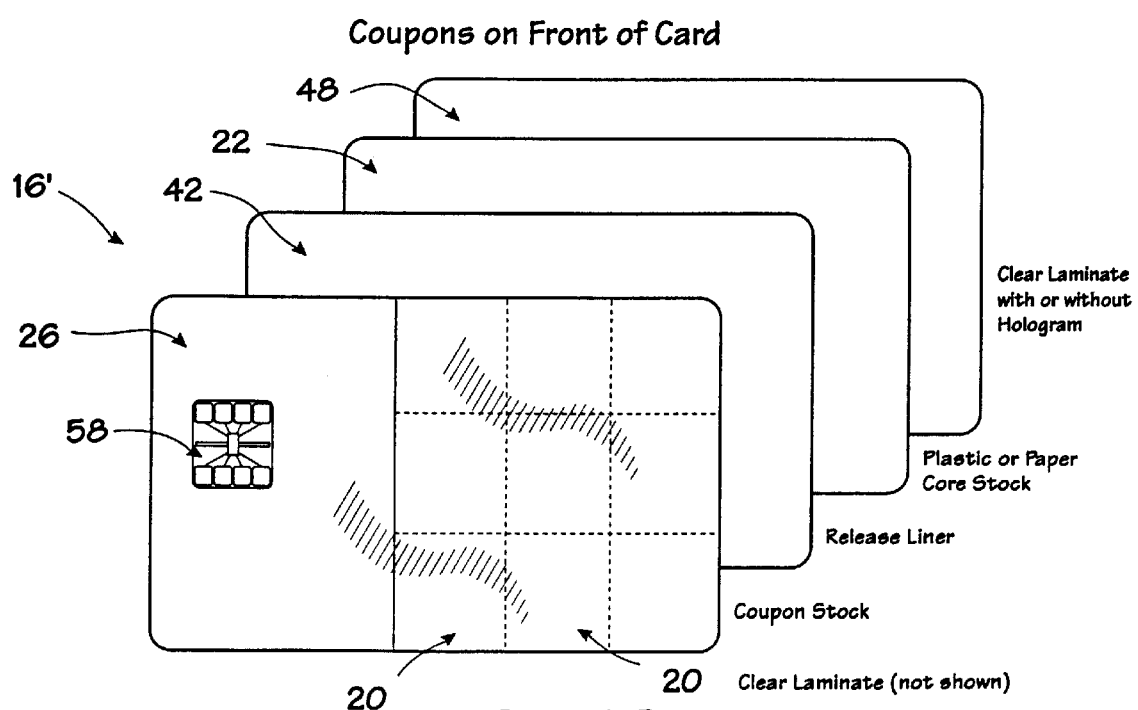
FIG. 15 is an exploded elevational view of a multi-purpose card having an integrated circuit chip and detachable coupons on one side thereof.

With reference to FIG. 15, the removable coupons 20 can be formed in a top layer coupon stock 26, with an integrated chip 58 attached thereto on one side thereof which has not been kiss-cut to form the removable coupons 20. The coupon stock layer 26 is attached to the base layer 22 by way of an intermediate release liner 42, as described above. A clear laminate layer 48 may be attached to the back side of the base layer 22 for added support, and may or may not bear a hologram 50. Due to the fact that these cards can be produced outside of the constraints of the promotional mailer 10, the base layer 22 can comprise a single layer of plastic or paper core stock, or multiple layers as described above.

Figure 16:
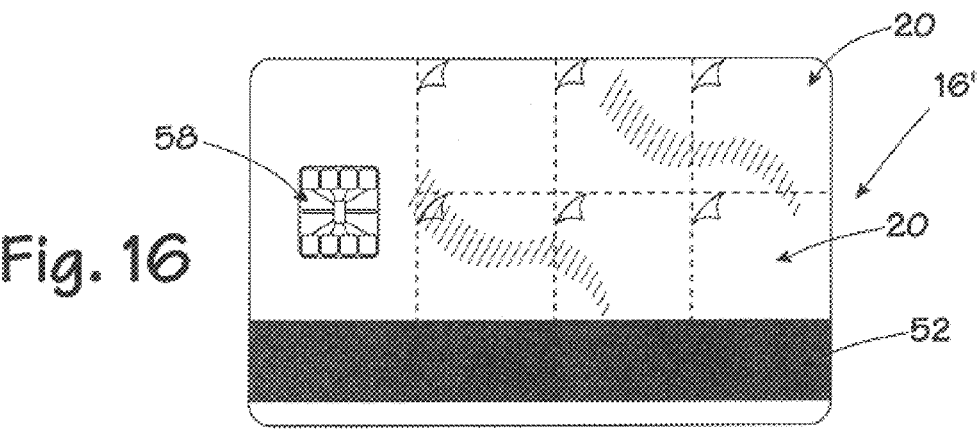
FIG. 16 is a top plan view of a multi-purpose card embodying the present invention and having an integrated circuit chip, magnetic strip, and detachable coupons associated therewith.

Referring now to FIG. 16, another multi-purpose card 16' is shown having a integrated circuit chip 58, a magnetic strip 52, and a plurality of removable coupons 20 on one side thereof. The removable coupons 20 are formed as described above, or otherwise known in the industry, with the magnetic strip 52 and integrated circuit chip 58 applied directly to the base layer 22 or top coupon layer 26.

Figure 17:
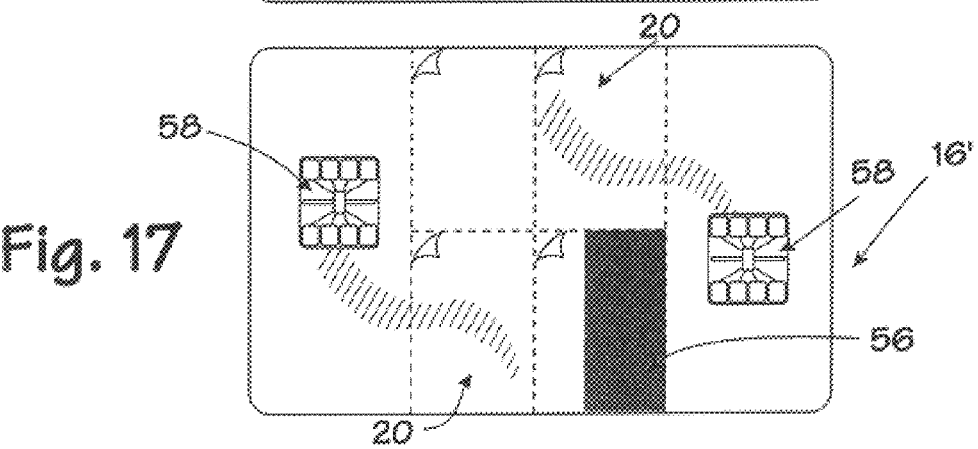
FIG. 17 is a top plan view of a multi-purpose card embodying the present invention having two integrated circuit chips, a scratch-off foil area, and detachable coupons associated therewith.

Referring now to FIG. 17, yet another multi-purpose redemption card 16' is illustrated having a plurality of removable coupons 20 in a central portion of the card 16', and having two integrated circuit chips 58 on opposite sides of the card 16' and mis-aligned with one another. The redemption card 16' of FIGS. 16 and 17 can be used by removing the detachable coupons 20, swiping the magnetic strip 52, or inserting the integrated circuit chip 58 into an appropriate reader to obtain the proper discounts or the like. With the card of 16' of FIG. 17, the two integrated circuit chips 58 enable the user of the card 16' to insert one end of the card so that only one of the integrated circuit chips 58 is read, and inserting the other end of the card 16' so that the second integrated circuit chip 58 is read. Each integrated circuit chip 58 can include different information, or redemption values. With the multiple redemption means included in each card 16 or 16', promotional offers could in fact be offered by two companies using the same card. More likely, however, the card could be used by a single company owning several retail or restaurant establishments. For example, the parent company of KFC® and Pizza Hut® could provide promotional offers on the same card 16 or 16' which could selectively be used by either restaurant. Similarly, a fast foot chain could offer promotion and redemption offers for not only its fast food chain, but also its exclusive soft drink provider, or vice versa.

Figure 18:
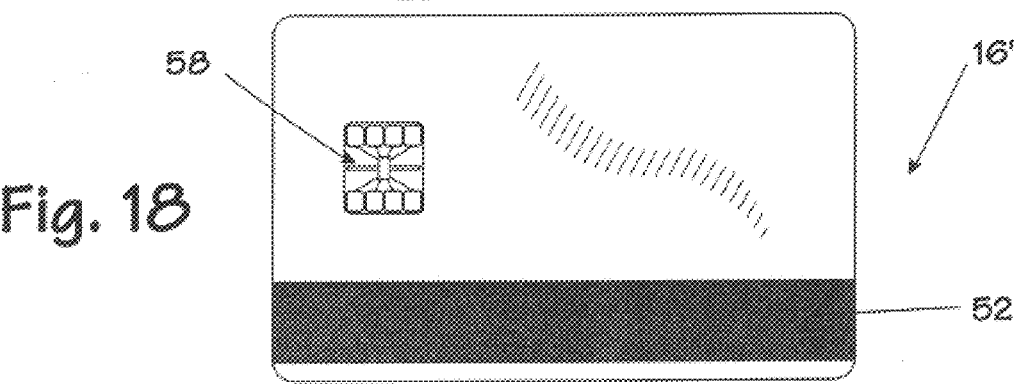
FIG. 18 is a top plan view of another multi-purpose card embodying the present invention having an integrated circuit chip and a magnetic strip associated therewith.

Referring now to FIG. 18, a multi-purpose card 16' is shown having a magnetic strip 52 and integrated circuit chip 58 on one side thereof. Of course, the magnetic strip 52 can be placed on either side of the card 16', or even on both sides to suit the particular needs of the card. Similarly, an integrated circuit chip 58 can be placed on either or both sides of the card 16'.

Figure 19:
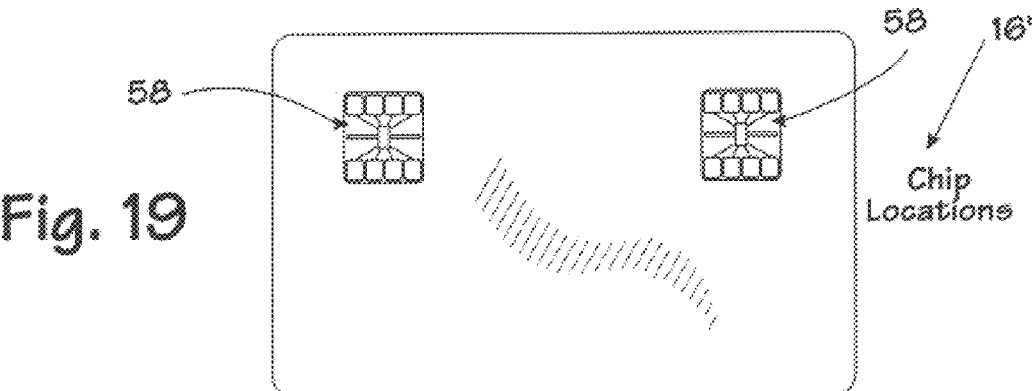
FIG. 19 is a top plan view of a multi-purpose card embodying the present invention having two integrated circuit chips associated therewith.

Referring now to FIG. 19, yet another multi-purpose card 16' is shown having two integrated circuit chips 58 on the same surface of the card 16' and in alignment with one another. The card 16' of FIGS. 18 and 19, as well as those of FIGS. 20–23, are particularly useful as financial transaction cards. For example, the card 16' of FIG. 18 can operate as a house card, wherein either the magnetic strip 52 or integrated circuit chip 58 operates as a debit card, while the other operates as a credit card. Other combinations can be realized as well. The card 16' of FIG. 19, could also accommodate both a debit card and credit card in that one of the integrated circuit chips 58 would contain the information for the debit card, while the other would have credit card information. It is envisioned that this card 16' could in fact be two different types of credit cards, for example one half of the card being Visa®, while the other half is a MasterCard®. Thus, if the consumer wanted to use his or her Visa® card, the user would insert the end having the applicable integrated circuit chip 58 into the appropriate reader. If, on the other hand, the user had to or wanted to use his or her MasterCard®, he or she could insert the appropriate end into the reader so that the integrated circuit chip 58 representing the MasterCard® would be read. The design on the card 16' could be split in half to aid the consumer in the recognition of which half of the card 16' to use.

Referring now to FIG. 20, yet another multi-purpose card 16' is shown having a magnetic strip 52 to integrated circuit chips 58 in alignment with one another and on the same surface of the card 16', as well an identifying picture 59 which would serve as identification for the card holder. Potentially, this card 16' could be issued by a single financial institution and bear debit card information on either the magnetic strip 52 or one of the integrated circuit chips 58, as well as two different types of credit cards on the remaining integrated circuit chips 58 and/or magnetic strip 52. Thus, the consumer could swipe the card 16' through a magnetic card reader, or insert either end of the card 16' into an integrated circuit chip reader. Such a card 16' would be extremely beneficial to the consumer as it would replace potentially up to three different cards within his or her wallet.

Referring now to FIG. 21, another multi-purpose card 16' embodying the present invention is illustrated having two integrated circuit chips 58 placed on the same surface of the card 16', and mis-aligned with one another. Two bar codes 54 are also imprinted upon the same surface of the card 16'. Of course, it will be appreciated by the reader that different combinations of the bar codes 54 and integrated circuit chips 58 could be placed on either side of the card 16', or in any configuration or arrangement. As illustrated, the card 16' could once again represent two different financial transaction cards. These could be used in a retail establishment, as a credit card, etc. One of the integrated circuit chips 58 could correlate with one of the bar codes 54, so that one half of the card 16' is used for one function or at one retail establishment, while the other integrated circuit chip 58 and bar code 54 are used separately. Thus, the consumer could insert either end of the card 16' into an appropriate integrated circuit chip reader, or have either bar code 54 scanned. It will appreciated by the reader that the two bar codes 54 and integrated circuit chips 58 could also each represent a different transaction means or redemption means.

Referring now to FIG. 22, another multi-purpose card embodying the present invention is illustrated having an integrated circuit chip 58 on both sides of the card 16'. A scratch-foil area 56 is also shown, which upon removal would provide the owner of the card with pertinent information such as a PIN number, signature line, or other security or promotional information. It should be understood that the inclusion of the scratch-off foil 56 is optional as the integrated circuit chips 58 may be placed solely on the card 16'. With this configuration, the card 16' could represent two different types of financial transaction cards, or have two distinct promotional offers, on either side of the card 16'. Thus, the owner of the card would insert the integrated circuit chip 58 either face up or down depending upon the transactional card or promotional offer desired to be employed at that particular time, while not reading upon the other transactional card or promotional offer.

Referring now to FIG. 23, another transactional card 16' embodying the present invention is shown having two integrated circuit chips 58 aligned within one another on the same surface and side of the card 16'. It will be noted by the reader that in some of the illustrations the integrated circuit chips 58 are shown in a central position, while in others the integrated circuit chip 58 is positioned off of center. This is due to the fact that the card readers can be adjusted by incorporating more than one reader head within the reader, or designed such that the reader can be repositioned to accommodate the cards 16 and 16' of the present invention. The card 16' of FIG. 23 could be multi-purpose in that it could represent different financial transactional cards, different promotions, or the like. The card 16', as well as several of the above-described cards 16', could be used for security purposes. In this particular embodiment, by placing two integrated circuit chips 58 adjacent one another, a single reader having two heads could simultaneously read both integrated circuit chips 58 for access or clearance. Reading two integrated circuit chips 58 simultaneously greatly increases the difficulty of creating fraudulent cards. A clear laminate layer 48 may be placed over the card 16' which may also contain a hologram 50 for additional identification or security purposes.

It is to be understood by the reader that the multi-purpose card 16' of the present invention is not necessarily limited by the type of integrated circuit chip 58 nor in the placement, number, nor configuration of the holograms 50, magnetic strips 52, bar codes 54, scratch-off foil layers 56, integrated circuit chips 58, or any other currently known or yet to be devised information containing or redemption means. Although the multi-purpose card 16' can be sent via First Class Mail using the promotional mailer 10 described above, the combination of the multiple redemption and transactional information means on a single card is itself inventive and the cards 16' can be produced separately and distributed using existing means. In the case that the card 16' is produced separately by traditional means, it typically is of a thickness of approximately 30 mm or thicker.

Figure 24:
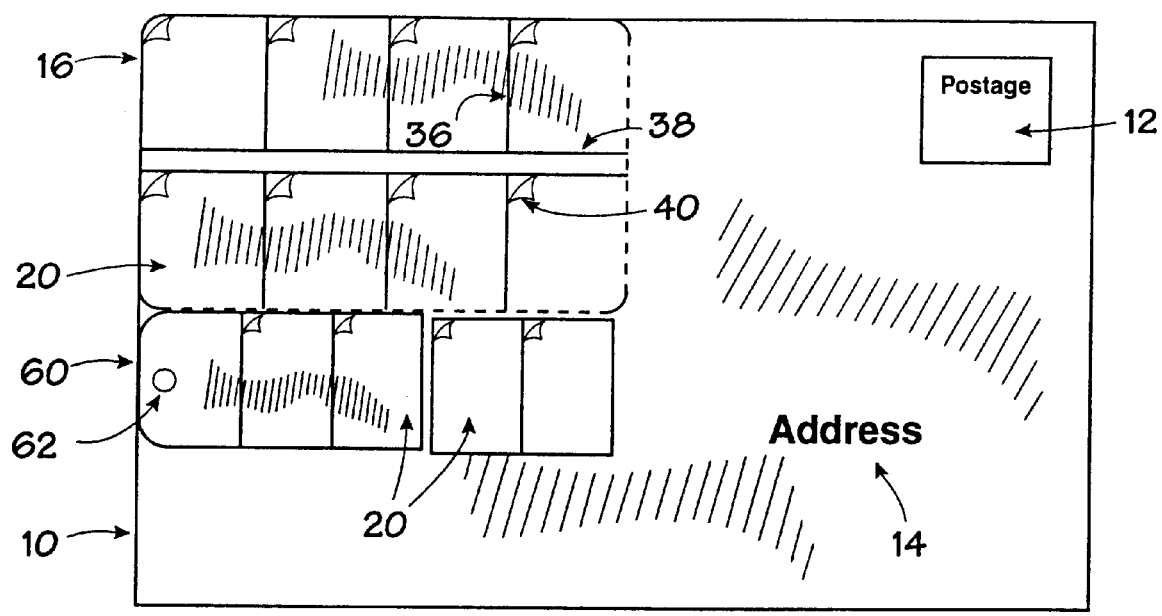
FIG. 24 is a top view of a front side of a promotional mailer in accordance with the present invention containing a redemption card and a key tag redemption card.
Figure 25:
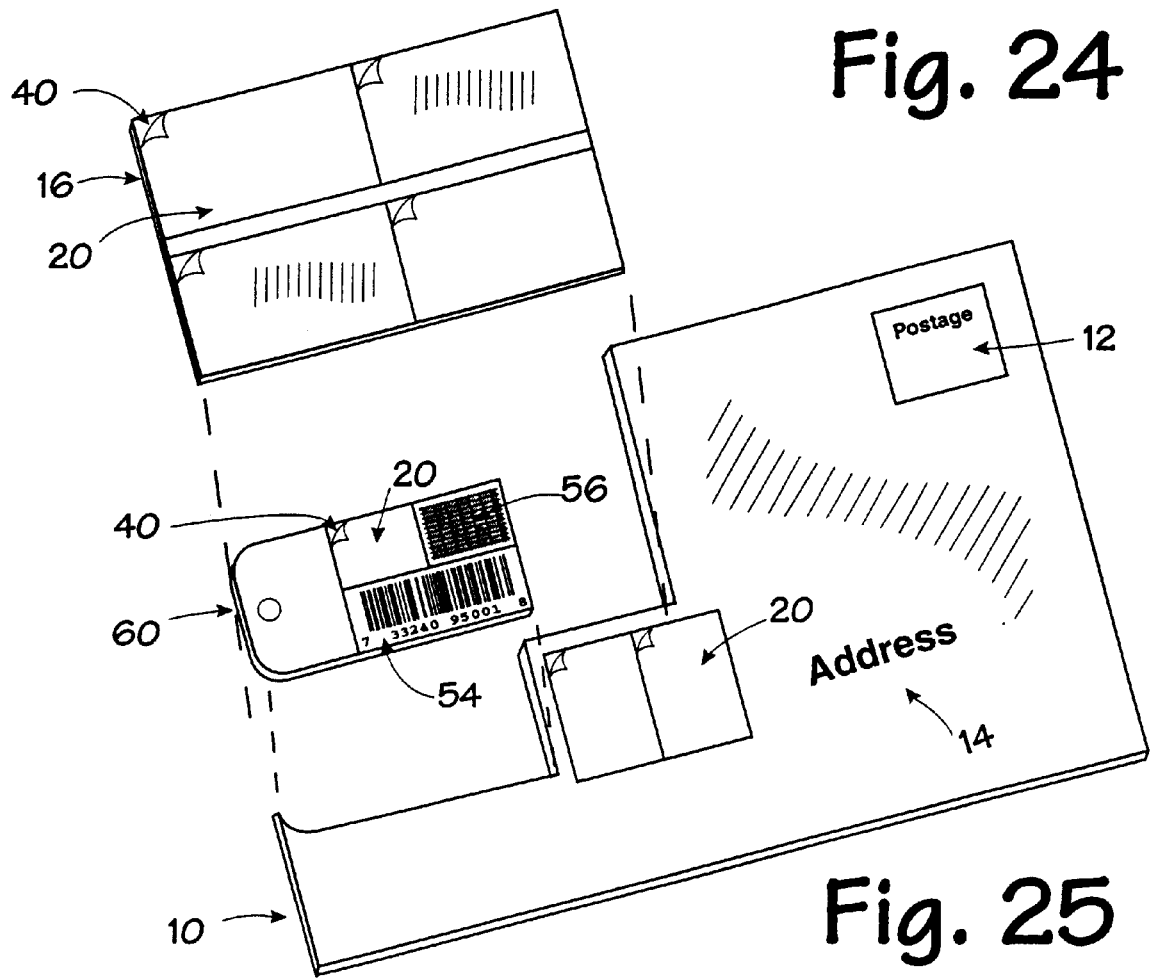
FIG. 25 is an exploded perspective view of a promotional mailer similar to FIG. 24, illustrating the removal of the redemption card and key tag.

Although the redemption card 16 and 16' has been described as approximating the size of a credit card, it is to be understood that it is not limited to such. For example, as illustrated in FIG. 24, a promotional mailer 10 may include a redemption card 16 approximating the size of a credit card, as well as a smaller redemption card in the form of a key tag card 60. The key tag card 60 is much smaller and sized to fit on a key chain through an aperture 62 formed therein and comfortably carried in the card holder's pocket. Similar to the redemption card 16 described above, the key tag card 60 has at least one edge defined by the outer periphery of the promotional mailer 10, and is perforated in a similar matter as described above so as to be forcibly detached from the promotional mailer, as illustrated in FIG. 25. With continuing reference to FIG. 25, the key tag card 60 can include any of the previous redemption offers and means, including the coupon 20 scratch-off foil 56, bar code 54, etc. In this way, the promotional mailer 10 can supply two individuals in one household with promotional offers, one in the form of the redemption card 16 to be placed in the user's wallet, while another member of the household may attach the key tag card 60 onto a key chain. The promotional offers may be duplicated between the redemption card 16 and key tag card 60, or offer different promotions and offers.

Figure 26:
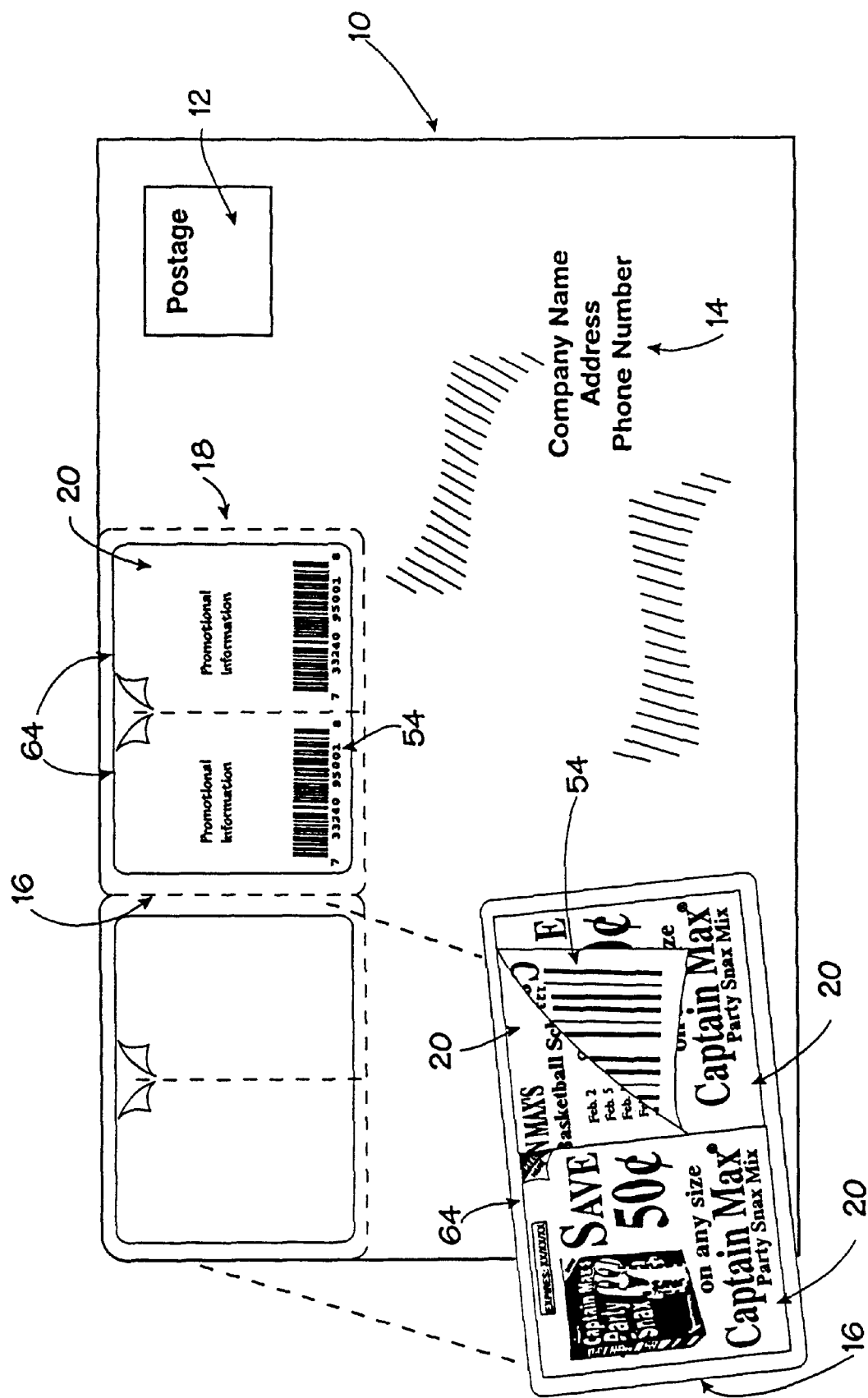
FIG. 26 is a top view of a front side of another promotional mailer containing a redemption card.

With reference to FIG. 26, yet another redemption card 16 is illustrated, wherein the redemption card 16 includes, for illustrative exemplary purposes, four detachable coupons 20 formed thereon. It should be understood by the reader that this embodiment may contain more or fewer coupons 20. The redemption card 16 is defined by perforations 18 at an outer periphery thereof, as well as additional perforations 18 which can be used to separate the redemption card 16 into pairs, or even individual coupon cards 64. Thus, as the coupons 20 are redeemed, the card holder may detach the area previously holding the coupon 20 from the redemption card 16 and decrease the size thereof for storage purposes. Alternatively, the card holder may separate the promotional offers and distribute them among friends and family.

The coupon 20 as illustrated in FIG. 26 may comprise double flap coupons, each coupon will be for a cents off product at the supermarket, for example. The shopper keeps the double flat coupon in her purse and uses the coupons as she purchases the items on the coupons. These coupons 20 preferably have the evaporating or no-stick adhesive as described above. All cents off store coupons now have bar codes printed on them so that the cashier can electronically credit the shopper with the value of the card. Conventional coupons have the bar code and the coupon information printed on the same side of the coupon. Because of the requirement of printing the coupon information and the bar code on the same side of the conventional store coupon, the coupon cannot be reduced in size beyond its printing requirements. The present invention can allow the size of the coupon 20 to be reduced by printing the bar code 54 on the other side, front or back, of the coupon 20. This allows the coupon 20 to be smaller, or it allows for more information to be printed on the front of the card 16, because the bar code 54 is eliminated from the front which takes up space. The reduced size of these coupons 20 is an advertising and marketing advantage, because several coupons can be placed on the double flap coupon which is not very large, and it allows for convenience by the shopper in that it is convenient to have several coupons on one card, and the card takes up very little space in the shoppers purse. Also, yet another coupon or promotional information or offers could be printed onto the underlying card itself so that once the overlying coupon 20 is redeemed, an underlying coupon can still be redeemed.

Figure 27:
FIG. 27 is an elevational view of a promotional mailer in the form of a fold-over post card in accordance with the present invention.

With reference now to FIG. 27, a fold-over promotional mailer post card 66 is illustrated. Such post cards are often used in special programs where a return portion of the card is to be mailed back. This can be particularly useful in situations where businesses, schools and other charitable organizations need to raise money. The promotional mailer 66 acts as a fundraising mailer, with a person receiving the post card or the promotional mailer 66 and returning a portion thereof upon receipt for purchasing or tracking purposes. Typically, the person would retain the portion of the mailer 66 housing the redemption card 16. The fold-over promotional mailer 66 also enables additional information and advertisements to be placed thereon.

Figures 28, 29:
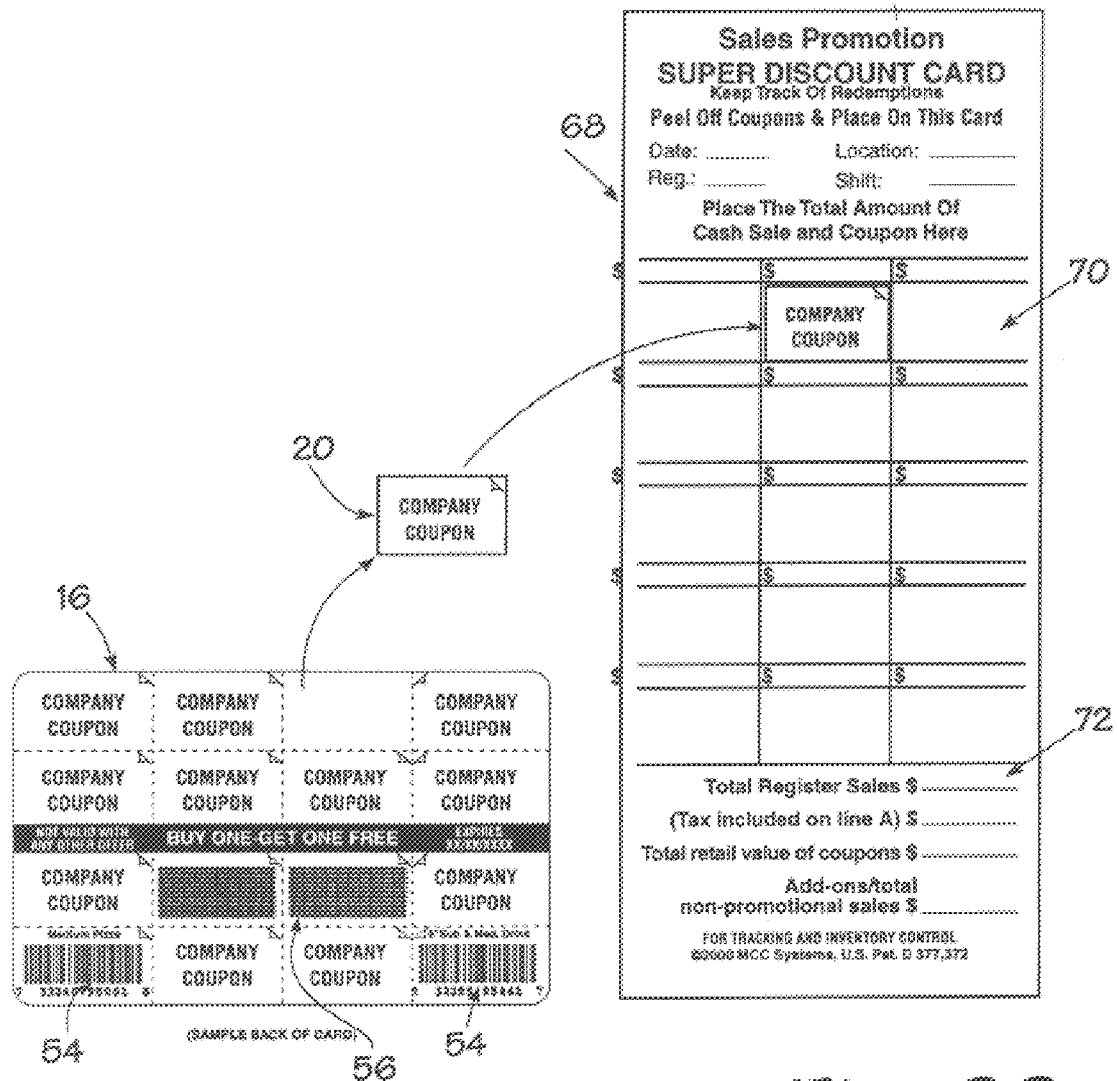
FIG. 28 is an elevational view of a redemption card in accordance with the present invention, illustrating a coupon removed therefrom.
FIG. 29 is an elevational view of track sheet used in accordance with the present invention.
Figure 30:
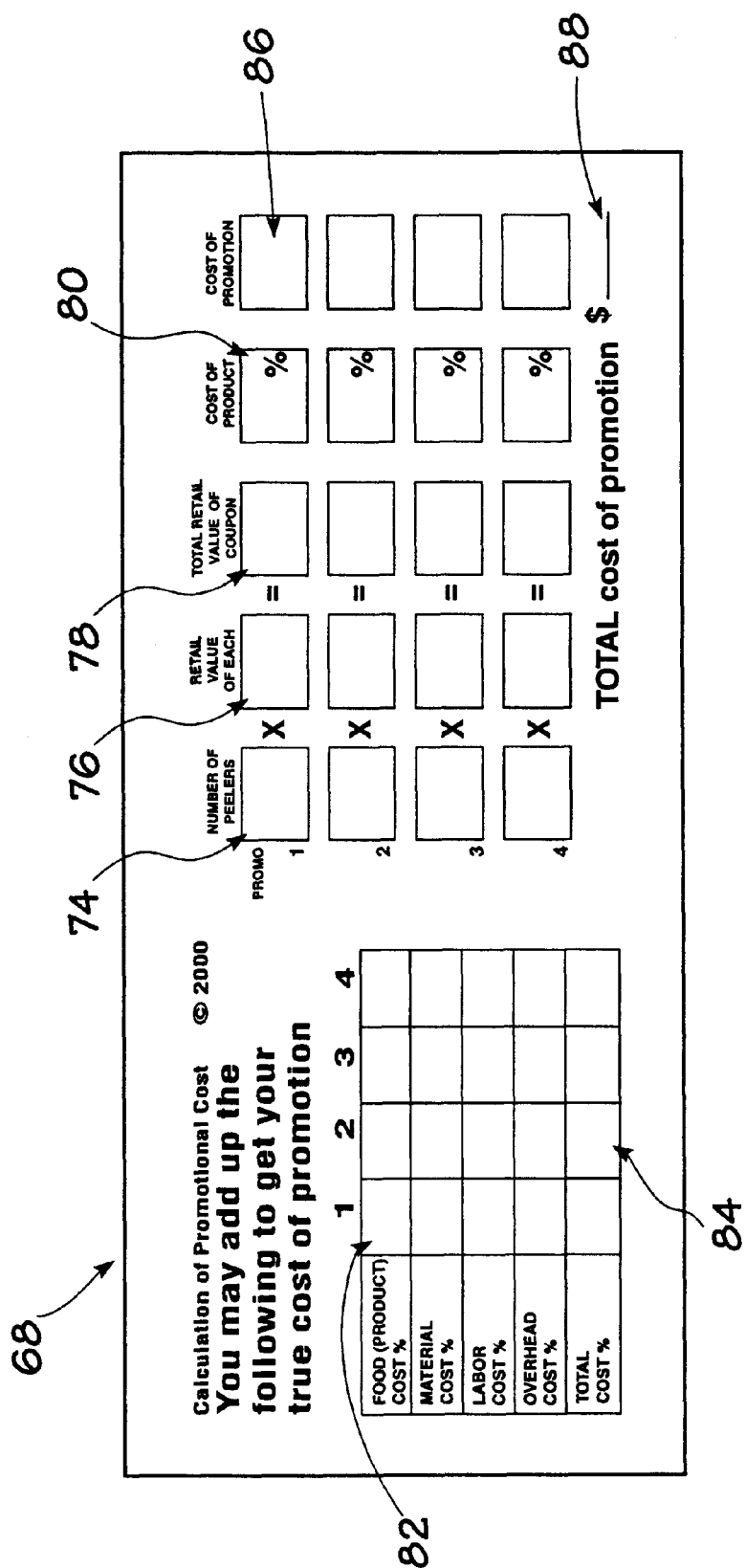
FIG. 30 is a back side of the tracking sheet of FIG. 29.

With reference now to FIGS. 28–30, a tracking system is illustrated wherein the detachable coupons 20 removed from the redemption card 16 can be stored, tracked, and an accounting made using a tracking sheet 68.

FIG. 29 illustrates a top plan view of the tracking sheet 68 where each redeeming peel-off coupon 20 from the card 16 can be affixed thereto. After the counter clerk removes a peel-off coupon 20 from the coupon card 16, he or she affixes the coupon 20 onto one of the squares 70 of the tracking card, as shown in FIG. 29.

The total amount of the sale is then written in the top of the square 70 adjacent to the $ symbol and immediately above the coupon 20. At the end of the shift, or sooner if the tracking sheet is filled up with redeemed coupons, the clerk then adds up the total dollar value on the front of the sheet for the total sales, which is entered on line 72 towards the bottom.

The back side of the tracking sheet 68 in FIG. 30 illustrates four rows of boxes 74–80. In the first box 74 in a row one, the clerk enters the total number of peel-off coupons 20 received for the promotion. For example, buy one regular hamburger and get one free. The clerk then enters the price of the peel-off items in the second box 76 in row one. The amount in box one is multiplied by the amount in box two and the product of the multiplication is entered in box three 78 on the first row. The clerk must then calculate the percentage of the cost of promotion to be entered in box 80. In the left column 82 the percentage of the product cost is entered, then the cost of material is entered and then the total labor to make the item is entered. These figures are supplied by management. The total is added and entered in box 84. The same number is entered in box 80 in the first row. The number in box 80 is subtracted from the number in box 78 to arrive at the cost of the promotion, which is entered in box 86 in the last row. The next three rows of boxes are used if the promotion covers other items such as a free coke or order of fries. The right boxes 86 and below are totaled to arrive at the total cost of the promotion which is entered on line 88. The tracking sheet 68 can be any type of surface where the redeemed coupons 20 could be affixed to. For example, it could be a black piece of cardboard, a blank sheet of paper, or any flat unmarked surface capable of holding the redeemed coupons. Also the cash register tape can be used to affix the coupons to the tape. (The self sticking coupon works well on the cash register tape). The coupons may also be placed on any other tracking system.

After a tracking sheet 68 such as illustrated in FIG. 29 is filled with redeemed coupons 20, the filled tracking sheets 68 could be scanned or read by a bar code reader that would send the data to a computer which would tabulate the redeemed coupons to accelerate the tracking process, and would reduce or eliminate human error. It would also reduce the number of man hours needed to manually tabulate the filled tracking sheets.

Although several embodiments of the invention have been described in detail for purposes of illustration, various modifications may be made without departing from the spirit and scope of the invention. Accordingly, the invention is not to be limited, except as by the appended claims.

What is claimed is:

1. A postcard promotional mailer, comprising:

a postcard comprising a base layer having a peripheral edge and first and second surfaces, a plastic film laminated to the first side of the base layer, a top layer adhered to the first side of the base layer;

a multi-purpose card defined by score lines intermittently cut through the top layer, base layer and plastic film such so as to securely maintain the multi-purpose card in place until forcibly removed, the multi-purpose card having at least one edge defined by the peripheral edge of the base layer;

a plurality of redemption or charging means including at least one of a magnetic strip, a bar code, detachable coupons, picture, or an integrated circuit chip which is associated with the multi-purpose card; and postage information and address information imprinted onto the postcard outside of the multi-purpose card;

whereby the multi-purpose card may be detached from the postcard and used for different transactions or purposes.

2. The promotional mailer of claim 1, wherein the redemption or charging means includes first and second integrated circuit chips each including information from different entities so as to enable the selective use of either integrated circuit chip.

3. The promotional mailer of claim 2, wherein the first and second integrated circuit chips are aligned with one another.

4. The promotional mailer of claim 2, wherein the first and second integrated circuit chips are mis-aligned with one another.

5. The promotional mailer of claim 2, wherein the first and second integrated circuit chips are on opposite surfaces of the multi-purpose card.

6. The promotional mailer of claim 1, including a laminate layer including a hologram, overlying and attached to the multi-purpose card.

7. The promotional mailer of claim 1, including a defined area of the multi-purpose card having information printed thereon and covered with a scratch-off foil treatment.

8. The promotional mailer of claim 1, wherein the redemption or charging means includes first and second magnetic strips, each strip including information from different entities so as to enable the selective use of either magnetic strip.

9. The promotional mailer of claim 8, wherein the first and second magnetic strips are disposed on opposite sides of the card.

10. The promotional mailer of claim 8, wherein the first and second magnetic strips are disposed on opposite edges of the card.

* * * * *